No. 618,272. Patented Jan. 24, 1899.
M. C. JOHNSON.
GEAR.
(Application filed Apr. 2, 1898.)
(No Model.)
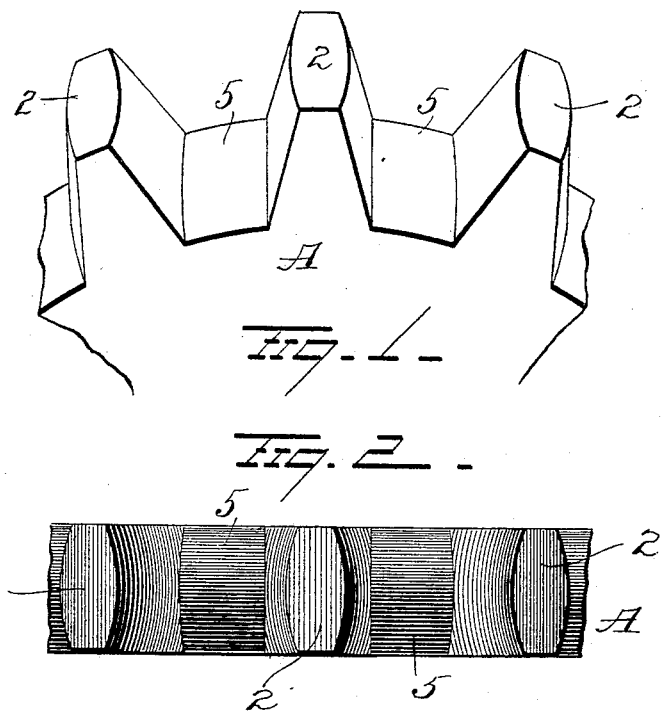

UNITED STATES PATENT OFFICE.

MOSES C. JOHNSON, OF HARTFORD, CONNECTICUT.

GEAR.

SPECIFICATION forming part of Letters Patent No. 618,272, dated January 24, 1899.

Application filed April 2, 1898. Serial No. 676,242. (No model.)

*To all whom it may concern:*

Be it known that I, MOSES C. JOHNSON, of Hartford, in the county of Hartford and State of Connecticut, have invented certain new and useful Improvements in Gears; and I do hereby declare the following to be a full, clear, and exact description of the invention, such as will enable others skilled in the art to which it appertains to make and use the same.

My invention relates to an improvement in gears, the object of the invention being to prevent binding of the teeth of two intermeshing gear-wheels when for any reason they are not set perfectly true, or, in other words, their axes are not absolutely parallel or at right angles to each other.

With this object in view the invention consists in certain novel features of construction and combinations and arrangement of parts, as hereinafter set forth, and pointed out in the claims.

In the accompanying drawings, Figure 1 is a perspective view of a portion of a gear-wheel embodying my invention, and Fig. 2 is an edge or peripheral view.

A represents a gear-wheel which has been cut from the usual flat cylindrical disk of metal, the periphery of said disk being cut out between the teeth, leaving the extreme peripheral portions or faces 2 of the teeth straight and untouched or coincident with the original periphery. The teeth are so cut that the inner or working faces of each tooth are convex longitudinally of the wheel, and the bottom 5 of the space between each two teeth is made convex longitudinally of the wheel. The three faces—viz., the working faces of the teeth and the bottoms of the spaces between them—will preferably be cut on gradual, regular, and uniform curves, the highest points of all the curves being coincident midway between their ends longitudinally of the gear.

By constructing a gear as above set forth the teeth of two wheels will, like a ball-bearing, only touch at a point and never on a line, and hence friction will be reduced to a minimum. True parallelism of axes will not be essential to the easy running of the gear, and there will be no binding, twisting, and undue wearing between the gears.

My improved gear is powerful. Its teeth can be easily cut. Requirement for perfectly true contact of gear-teeth is obviated, because the engagement of the teeth at one point on the side or working face is rendered just as effectual as at any other point.

My improved form of tooth may of course be embodied in the form of a rack, bevel-gear, or any other form of gear without departing from the spirit of my invention or limiting its scope.

Having fully described my invention, what I claim as new, and desire to secure by Letters Patent, is—

1. A gear having the working faces of its teeth convex longitudinally thereof and having the bottoms of the spaces between each two teeth convex longitudinally thereof.

2. A gear having the inner sides or working faces of its teeth convex longitudinally thereof and having their peripheral portions straight longitudinally thereof and having the bottoms of the spaces between the teeth convex longitudinally thereof.

In testimony whereof I have signed this specification in the presence of two subscribing witnesses.

MOSES C. JOHNSON.

Witnesses:
C. S. DRURY,
G. F. DOWNING.